(12) United States Patent
Gaspers et al.

(10) Patent No.: US 8,770,355 B2
(45) Date of Patent: Jul. 8, 2014

(54) BRAKE DISK

(75) Inventors: Heinz-Jurgen Gaspers, Aachen (DE); Helmut Hoffmann, Mulheim (DE)

(73) Assignee: Faiveley Transport Witten GmbH, Witten (DE)

( * ) Notice: Subject to any disclaimer, the term of this patent is extended or adjusted under 35 U.S.C. 154(b) by 442 days.

(21) Appl. No.: 12/680,006

(22) PCT Filed: Jul. 15, 2008

(86) PCT No.: PCT/EP2008/005762
§ 371 (c)(1),
(2), (4) Date: Jun. 21, 2010

(87) PCT Pub. No.: WO2009/043398
PCT Pub. Date: Apr. 9, 2009

(65) Prior Publication Data
US 2010/0258392 A1    Oct. 14, 2010

(30) Foreign Application Priority Data
Sep. 28, 2007 (DE) .................. 20 2007 013 658 U

(51) Int. Cl.
*F16D 65/12* (2006.01)
*F16D 65/84* (2006.01)

(52) U.S. Cl.
USPC .......... 188/218 XL; 188/71.4; 188/71.6; 188/73.1; 188/73.2; 188/251 M; 188/264 A; 188/264 AA

(58) Field of Classification Search
USPC ........... 188/218 XL, 381, 71.6, 73.2, 264 A, 188/264 AA
IPC .............................. F16D 65/12, 65/84
See application file for complete search history.

(56) References Cited

U.S. PATENT DOCUMENTS

| | | | | |
|---|---|---|---|---|
| 3,730,304 A | * | 5/1973 | Buyze | 188/218 XL |
| 4,865,167 A | * | 9/1989 | Giorgetti et al. | 188/218 XL |
| 6,386,341 B1 | * | 5/2002 | Martin | 188/218 XL |

FOREIGN PATENT DOCUMENTS

| | | |
|---|---|---|
| DE | 20 2006 017092 U1 | 1/2007 |
| DE | 20 2007 009345 U1 | 8/2007 |

(Continued)

OTHER PUBLICATIONS

PCT Notification of Transmittal of Translation of the International Preliminary Report on Patentability dated Jun. 10, 2010; International Preliminary Report on Patentability dated Jun. 1, 2010; Written Opinion of the International Searching Authority (translation); all re International Application No. PCT/EP2008/005762.

*Primary Examiner* — Robert A Siconolfi
*Assistant Examiner* — San Aung
(74) *Attorney, Agent, or Firm* — Kelly & Kelley, LLP

(57) ABSTRACT

The invention relates to a brake disk having a face-end friction ring portion on which a brake disk cam provided with a cam bore is molded. In order to further develop the brake disk in such a manner that adequate safeties with respect to the permissible material values on brake disks for high-energy application cases are provided and material stresses in the region of the brake disk cam of the brake disk, which are caused through temperature differentials within the brake disk as a consequence of high braking energy inputs, are reduced, the brake disk cam includes two arm parts which extend spaced from each other from the face-end friction ring portion in the direction of the cam bore and converge in front of the cam bore.

13 Claims, 1 Drawing Sheet

(56) References Cited

FOREIGN PATENT DOCUMENTS

| | | | |
|---|---|---|---|
| EP | 0 309 174 A | 3/1989 | |
| GB | 2108238 A * | 5/1983 | ............. F16D 65/12 |
| WO | WO 2005052403 A1 * | 6/2005 | ............. F16D 65/12 |
| WO | 2009/003659 A2 | 1/2009 | |

* cited by examiner

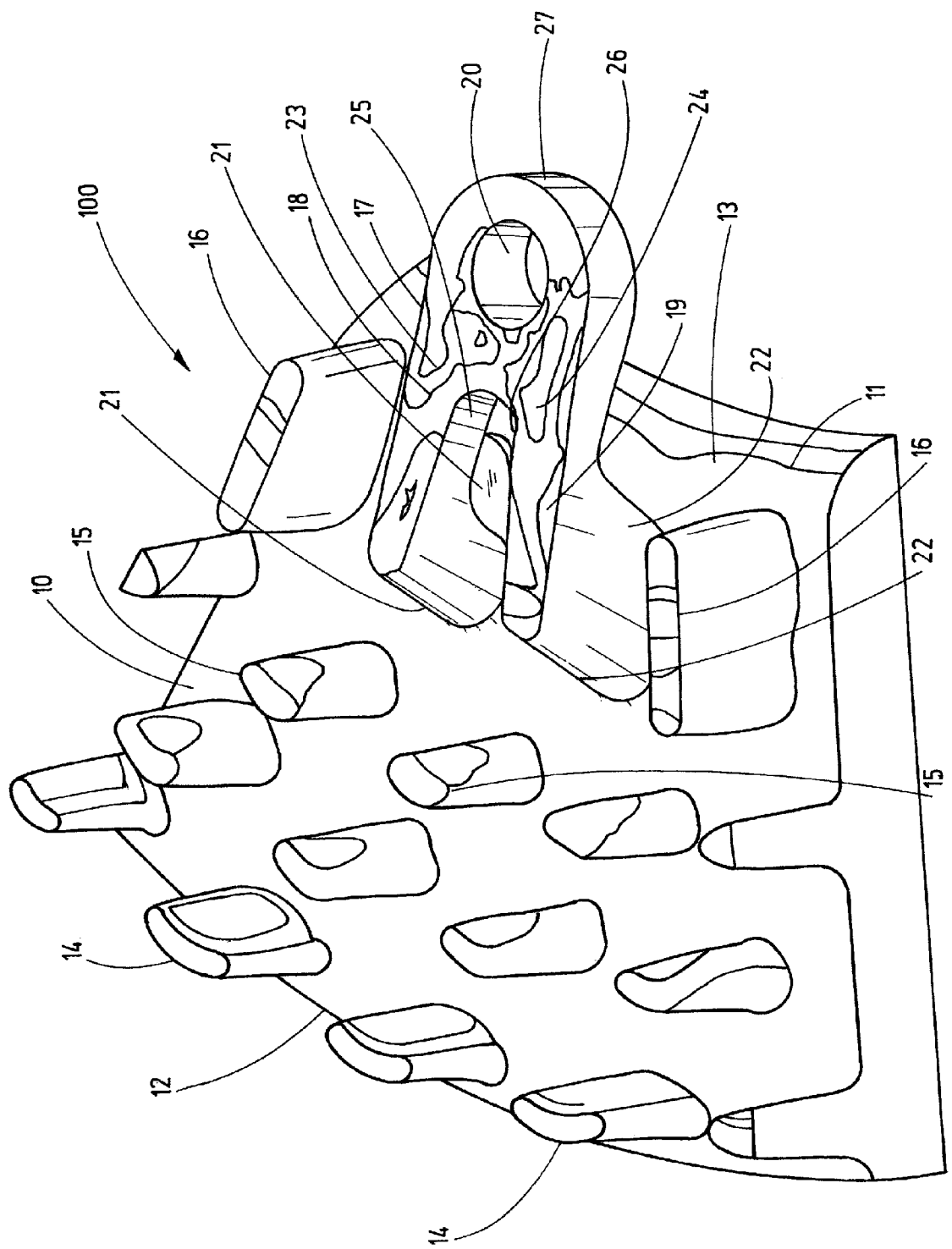

BRAKE DISK

TECHNICAL AREA

The invention relates to a brake disk having a face-end friction ring portion out of which a brake disk cam with a cam bore is moulded.

PRIOR ART

Brake disks of the type mentioned at the outset are known and familiar to the person skilled in the art, wherein the brake disks can be embodied in one part or two parts.

Two-part brake disks comprise a first and second disk half each of which is configured in the shape of a half circle or half ring and are brought together in a partition plane in order to form a brake disk ready for operation. Thus, because of its split embodiment, the brake disk can be arranged on shafts which do not permit axial assembly of the brake disks because of the geometrical configuration of the shaft.

The inner ventilation of the brake disks is made possible in that the brake disks comprise a first friction ring portion as well as a second friction ring portion and the friction ring portions are arranged plane-parallel to each other with a certain spacing. Between the two friction ring portions a multiplicity of cooling ribs is arranged between which in turn ventilation channels run. Through the brake disk rotation cooling air is directed through the ventilation channels in order to prevent excessive heating of the entire brake disk as a result of conversion of the braking power.

In order to additionally guarantee the operational safety even with high operating loads through shock loading and through thermal loads the German utility model No. 20 2007 009 345.4 additionally provides that brake disk cams are arranged between the cooling ribs. These cams can be present in the shape of tie-up cams which are arranged in the immediate vicinity of the brake belt and for example establish the connection between the brake disk and a disk hub. Here, the cams protrude radially from a friction ring portion in the direction of the centre point of the brake disk.

The shape of the cams in this context has to interact with the arrangement and shape of the cooling ribs in such a manner that the operational safety is also guaranteed in the case of high operating loads through shock loading as well as through thermal loads.

In particular, stop braking from a high speed can cause high inputs of braking energy. These braking energy inputs in turn can generate temperature differentials within the brake disk which result in material stresses in the region of the tie-up cams of the brake disk.

PRESENTATION OF THE INVENTION, OBJECT, SOLUTION, ADVANTAGES

Appreciating the shown prior art with brake disks of the type mentioned at the outset, the object of the present invention is therefore based on further developing a brake disk of the type mentioned at the outset in such a manner that adequate safeties with respect to the permissible material values on brake disks for high-energy application cases are provided. In addition, material stresses in the region of the brake cams of the brake disk, which are caused through temperature differentials within the brake disk as a result of high braking energy inputs are to be reduced.

This object is solved with the features of Claim 1. Advantageous embodiments of the invention are obtained from the subclaims.

According to the invention the brake disk cam comprises two arm parts which extend spaced from each other from the face-end friction ring portion in the direction of the cam bore and converge in front of the cam bore.

Each of the arm parts comprises a web which is moulded out of the face-end friction ring portion and which are followed by arms which are substantially parallel and spaced from the face-end friction ring portion. In this manner it is ensured that the brake disk cam is tied to the brake belt, which runs on the inner edge of the friction ring portion via two completely separated webs. The basic idea of the invention is the splitting of the brake disk cam into two separate arm parts except in the region of the cam bore.

The advantage of the invention is that through a configuration of the brake disk cam of this type a movement possibility of the arm parts of the cam upon thermal expansion of the brake disk is provided, thus bringing about a reduction of the stress increase in the arm parts as well as in the foot region, that is in the webs of the arm part. The brake disk according to the invention is more preferably suitable with high shock and thermal operating loads.

Preferentially the arm parts extend in the direction of an inner edge of the face-end friction ring portion. The cam bore in this case is arranged offset from the inner edge.

An advantageous configuration of the invention provides that the radius of the webs increases towards the surface of the face-end friction ring portion.

Through such an enlargement of the radii, high compressive-tensile stresses upon screening of the brake disk are avoided. Another contribution in this regard is that the webs of the brake disk cam are shaped in an inclined manner in axial direction and towards the inner edge of the face-end friction ring portions.

Preferentially the brake disk cam is formed in a roundish or oval shape on the side facing away from the web.

Another contribution to further reduction of the material stresses is that the arms laterally extend away from each other in the direction of the outer edge of the face-end friction ring portion and the arms on their narrow sides which converge in front of the cam bore are roundish in shape.

In the context of the invention the brake disk cam follows a brake belt of the friction ring portion and is thus located in the immediate vicinity of the brake belt which runs along the inner edge of the friction ring portion.

Further advantageous configurations of the invention provide that the brake disk cam is arranged between cooling ribs of the friction ring portion. In addition, the invention provides that cooling ribs are arranged between the brake disk cams and the outer edge of the face-end friction ring portion.

BRIEF DESCRIPTION OF THE DRAWINGS

The invention is explained in more detail in the following by means of FIG. 1.

FIG. 1 shows a top view of a detail of a friction ring portion in a schematic representation, wherein the view shows the arrangement of the cooling ribs and of the brake disk cam as well as its configuration.

FIG. 1 merely is an exemplary technical embodiment of the present invention.

BEST WAY TO CARRY OUT THE INVENTION

The brake disk shown in FIG. 1 is given the reference number 100.

Basically it consists of two face-end friction ring portions, wherein in FIG. 1 merely one friction ring portion 10 is shown. The friction ring portions form the friction surfaces of the brake disk 100. The friction ring portion 10 is limited by an inner edge 11 and an outer edge 12. In the region of the inner edge 11 is located the input radius or the brake disk belt 13. A multiplicity of cooling ribs 14, 15, 16, which cool the brake disk 10 during the braking operation through resultant convection between the cooling ribs, extends on the friction ring portion 10. In addition to this, the cooling ribs 14, 15, 16 contribute to the mechanical connection between the friction ring portion 10 and a second friction ring portion of the brake disk 100 which is not shown here.

The brake disk cam 17 is arranged between the cooling ribs 16. In addition, cooling ribs 14, 15 are located between the brake disk cam 17 and the outer edge 12 of the face-end friction ring portion 10. The brake disk cam 17 serves to tie the brake disk 100 for example to a hub. In order to additionally reduce material stresses, the brake disk cam 17 comprises two arm parts 18, 19 which extend spaced from each other from the face-end friction ring portion 10 in the direction of the cam bore 20 and converge in front of the cam bore 20. Here, the cam bore 20 is arranged offset from the inner edge 11.

The arm parts 18, 19 each comprise a web 21, 22 which are moulded on the face-end friction ring portion 100 and which are followed by arms 23, 24 which are substantially arranged parallel and spaced from the face-end friction ring portion 10. The radius of the webs 21, 22 increases towards the surface of the face-end friction ring portion 10. In the context of the invention it is also possible that the brake disk cam 17 tapers towards the cam bore 20.

In the embodiment shown here the arms 23, 24 are extended laterally away from each other in the direction of the outer edge 12 of the face-end friction ring portion 10. In addition, the arms 23, 24 are shaped in a roundish manner on their narrow sides 25, 26 which converge in front of the cam bore 20, whereas the brake disk cam 17 is moulded in a roundish manner on the side 27 facing away from the web. If applicable, the brake disk cam 17 on the side 27 facing away from the web can also be formed oval in shape. For the purpose of avoiding high compressive-tensile stresses upon screening of the brake disk the webs 21, 22 are configured inclined in axial direction and towards the inner edge 11.

In its embodiment the present invention is not limited to the preferred exemplary embodiment stated above. A number of versions is rather conceivable which make use of the solution shown even with embodiments of a fundamentally different type. Thus, the webs 21, 22 for example can have different radii. The cooling ribs 14, 15, 16 obviously can also have different configurations. In addition, the webs 21, 22 can be additionally provided with different transition radii. The webs 21, 22 can also have different shapes.

The invention claimed is:

1. A brake disk having a face-end friction ring portion on which a brake disk cam provided with a circular cam bore is moulded, wherein the brake disk cam is configured to connect the brake disk to a hub, characterised in that the brake disk cam comprises two arm parts which extend spaced from each other from the face-end friction ring portion in the direction of the circular cam bore and converge in front of the circular cam bore and behind the circular cam bore, and in that the arm parts each comprise a web which are moulded on the face-end friction ring portion and which are followed by arms which are substantially arranged parallel and spaced from the face-end friction ring portion.

2. The brake disk according to claim 1, characterised in that the arm parts extend in the direction of an inner edge of the face-end friction ring portion.

3. The brake disk according to claim 2, characterised in that the cam bore is arranged offset from the inner edge.

4. The brake disk according to any of claims 1-3, characterised in that the radius of the webs increases towards the surface of the face-end friction ring portion.

5. The brake disk according to any of claims 1-3, characterised in that the brake disk cam tapers towards the cam bore.

6. The brake disk according to claim 2, characterised in that the brake disk cam is moulded in an arcuate shape on a side facing away from the webs.

7. The brake disk according to claim 6, characterised in that the webs are configured inclined in axial direction and towards the inner edge.

8. The brake disk according to claim 7, characterised in that the arms are laterally extended away from each other in the direction of an outer edge of the face-end friction ring portion.

9. The brake disk according to any of claims 1-3 or 6-8, characterised in that the arms on their narrow sides which converge in front of the cam bore are arcuately shaped.

10. The brake disk according to any of claims 1-3 or 6-8, characterised in that the brake disk cam on a side facing away from the web is configured oval in shape.

11. The brake disk according to claim 8, characterised in that the brake disk cam is arranged between cooling ribs.

12. The brake disk according to claim 11, characterised in that between brake disk cam and an outer edge of the face-end friction ring portion, the cooling ribs are arranged.

13. The brake disk according to any of claims 1-3, 6, 8, 11 or 12, characterised in that the brake disk cam is arrange proximate to the inner edge of the friction ring portion.

\* \* \* \* \*